(12) United States Patent
Huang

(10) Patent No.: US 12,338,896 B2
(45) Date of Patent: Jun. 24, 2025

(54) SHAFT SEAL DEVICE

(71) Applicant: SCENIC PRECISE ELEMENT INC., Kaohsiung (TW)

(72) Inventor: Cheng-Hsiu Huang, Kaohsiung (TW)

(73) Assignee: SCENIC PRECISE ELEMENT INC., Kaohsiung (TW)

( * ) Notice: Subject to any disclaimer, the term of this patent is extended or adjusted under 35 U.S.C. 154(b) by 82 days.

(21) Appl. No.: 18/327,895

(22) Filed: Jun. 2, 2023

(65) Prior Publication Data

US 2023/0392693 A1 Dec. 7, 2023

(30) Foreign Application Priority Data

Jun. 2, 2022 (TW) .................................. 111120677

(51) Int. Cl.
*F16J 15/16* (2006.01)

(52) U.S. Cl.
CPC .................................. *F16J 15/162* (2013.01)

(58) Field of Classification Search
CPC ...................................................... F16J 15/162
See application file for complete search history.

(56) References Cited

U.S. PATENT DOCUMENTS

| | | | | |
|---|---|---|---|---|
| 4,560,173 A | * | 12/1985 | Adams | F16J 15/3404 |
| | | | | 277/408 |
| 5,217,234 A | * | 6/1993 | Hornsby | F16J 15/3404 |
| | | | | 277/408 |
| 8,033,549 B2 | * | 10/2011 | Huang | F16J 15/3484 |
| | | | | 277/408 |
| 8,177,236 B2 | * | 5/2012 | Anderberg | F16J 15/3404 |
| | | | | 277/408 |
| 8,196,802 B2 | * | 6/2012 | Huang | F16J 15/40 |
| | | | | 228/256 |
| 8,215,644 B2 | * | 7/2012 | Huang | F16J 15/3404 |
| | | | | 277/361 |
| 9,581,247 B2 | * | 2/2017 | Takigahira | F16J 15/3484 |
| 10,337,616 B2 | * | 7/2019 | Parkin | F16J 15/3484 |
| 10,605,255 B2 | * | 3/2020 | Kung | F16J 15/3484 |
| 2010/0308543 A1 | | 12/2010 | Huang | |
| 2019/0145421 A1 | * | 5/2019 | Kung | F04D 29/128 |
| | | | | 415/111 |

FOREIGN PATENT DOCUMENTS

TW          I362455 B      4/2012

OTHER PUBLICATIONS

English Translation of TW I362455.

* cited by examiner

*Primary Examiner* — Vishal A Patel
(74) *Attorney, Agent, or Firm* — WPAT LAW; Anthony King

(57) ABSTRACT

The present disclosure provides a shaft seal device. The shaft seal device includes a main body. The main body includes a channel, a first ring part, a second ring part, a liquid flow hole and a diversion structure. The channel passes through the main body, and includes a channel inner peripheral surface. The first ring part and the second ring part are formed on the channel inner peripheral surface. An aperture of the first ring part is greater than an aperture of the second ring part. The liquid flow hole passes through the main body from an outer surface of the main body to a first inner peripheral surface of the first ring part. The diversion structure is disposed on the first inner peripheral surface and is adjacent to the liquid flow hole.

13 Claims, 16 Drawing Sheets

SHAFT SEAL DEVICE

CROSS REFERENCE TO RELATED APPLICATIONS

This application claims priority of Taiwan application No. 111120677 filed on Jun. 2, 2022, which is incorporated by reference in its entirety.

BACKGROUND

Field of the Invention

The present disclosure relates to a shaft seal device and, more particularly, to a shaft seal device used for a rotating shaft.

Description of Related Art

In the prior art, a shaft seal device is used on a rotating shaft of a mechanical device. The shaft seal device includes a liquid inlet and a liquid outlet. The liquid inlet is for receiving a shaft seal liquid, and the liquid outlet is for discharging the shaft seal liquid. The shaft seal liquid, which provides lubrication and cooling effects, needs to be periodically replaced, so as to ensure smooth operation and prevent overheating of the shaft seal device. However, the conventional shaft seal device poses disadvantages regarding replacement of the shaft seal liquid, resulting in poor efficiency in the replacement of the shaft seal liquid, further affecting operation efficiency of the shaft seal device.

The details of the prior art provided above describe merely background techniques, and are not to be construed as a description of the subject matter of the present disclosure. In addition, the details of the prior art provided above are not to be considered as any part of the present application.

BRIEF SUMMARY OF THE INVENTION

A shaft seal device is provided according to an embodiment of the present disclosure. The shaft seal device includes a main body. The main body includes a channel, a first ring part, a second ring part, a liquid flow hole and a diversion structure. The channel passes through the main body, and includes a channel inner peripheral surface. The first ring part and the second ring part are formed on the channel inner peripheral surface. An aperture of the first ring part is greater than an aperture of the second ring part. The liquid flow hole passes through the main body from an outer surface of the main body to a first inner peripheral surface of the first ring part. The diversion structure is disposed on the first inner peripheral surface and is adjacent to the liquid flow hole.

In some embodiments, the diversion structure includes a block piece for guiding a liquid to flow from the liquid flow hole to the channel or from the channel to the liquid flow hole.

In some embodiments, the block piece includes a positioning portion for positioning the block piece at the main body.

In some embodiments, the main body further includes a positioning member, which protrudes from a side surface of the second ring part and is for positioning the positioning portion of the block piece.

In some embodiments, the diversion structure includes a recess, and is formed on the first inner peripheral surface of the first ring part and adjacent to the liquid flow hole.

In some embodiments, the recess includes an arched surface, which is connected to the first inner peripheral surface and the liquid flow hole.

In some embodiments, a ratio of a maximum width of the recess to a maximum depth of the recess is between 1.5 and 2.5, and a ratio of a maximum length of the recess to the maximum width of the recess is between 1.5 and 2.5.

In some embodiments, the second ring part includes a sloped notch having a sloped surface. The sloped surface extends from a second inner peripheral surface of the second ring part toward the first inner peripheral surface.

In some embodiments, a slope of the sloped surface is between 0.8 and 1.2.

In some embodiments, the shaft seal device further includes a shaft sleeve. The shaft sleeve is partially inserted in the channel of the main body, and includes a shaft sleeve outer peripheral surface corresponding in position to the channel inner peripheral surface.

In some embodiments, the shaft sleeve includes at least one groove formed on the shaft sleeve outer peripheral surface.

In some embodiments, the at least one groove extends in a lengthwise direction of the shaft sleeve.

In some embodiments, the shaft sleeve includes a first end portion and a second end portion, wherein a maximum width of the first end portion is greater than a maximum width of the channel and a maximum width of the second end portion is less than the maximum width of the channel. When the shaft sleeve is inserted in the channel, the first end portion and a part of the second end portion are located outside the channel.

In some embodiments, the shaft seal device further includes a shaft collar, which is for sleeving the part of the second end portion of the shaft sleeve when the shaft sleeve is partially inserted in the channel, wherein a maximum width of the shaft collar is greater than the maximum width of the channel.

In some embodiments, a material of the shaft sleeve includes silicon carbide or tungsten carbide.

In some embodiments, the second ring part includes at least one positioning slot, which is formed on the second inner peripheral surface and is for positioning a compression ring.

The technical features and advantages of the present disclosure are comprehensively given in the description above, so as to enable better understanding of the present disclosure from details given in the description below. Other technical features and advantages forming the subject matter of the claims of the present disclosure are to be given in the description below. A person skilled in the art of the present disclosure should understand that it would be easy to implement objects same as those of the present disclosure by modifications or designs of other structures or processes on the basis of the concept and specific embodiments disclosed in the description below. Moreover, a person skilled in the art should understand that such equivalent arrangements are encompassed within the spirit and scope of the present disclosure as defined by the appended claims.

BRIEF DESCRIPTION OF THE DRAWINGS

With reference to the embodiments, claims and the accompanying drawings, the disclosure of the present application can be better understood. Same element symbols and numerals in the drawings represent same elements.

DETAILED DESCRIPTION

Figure 1A:
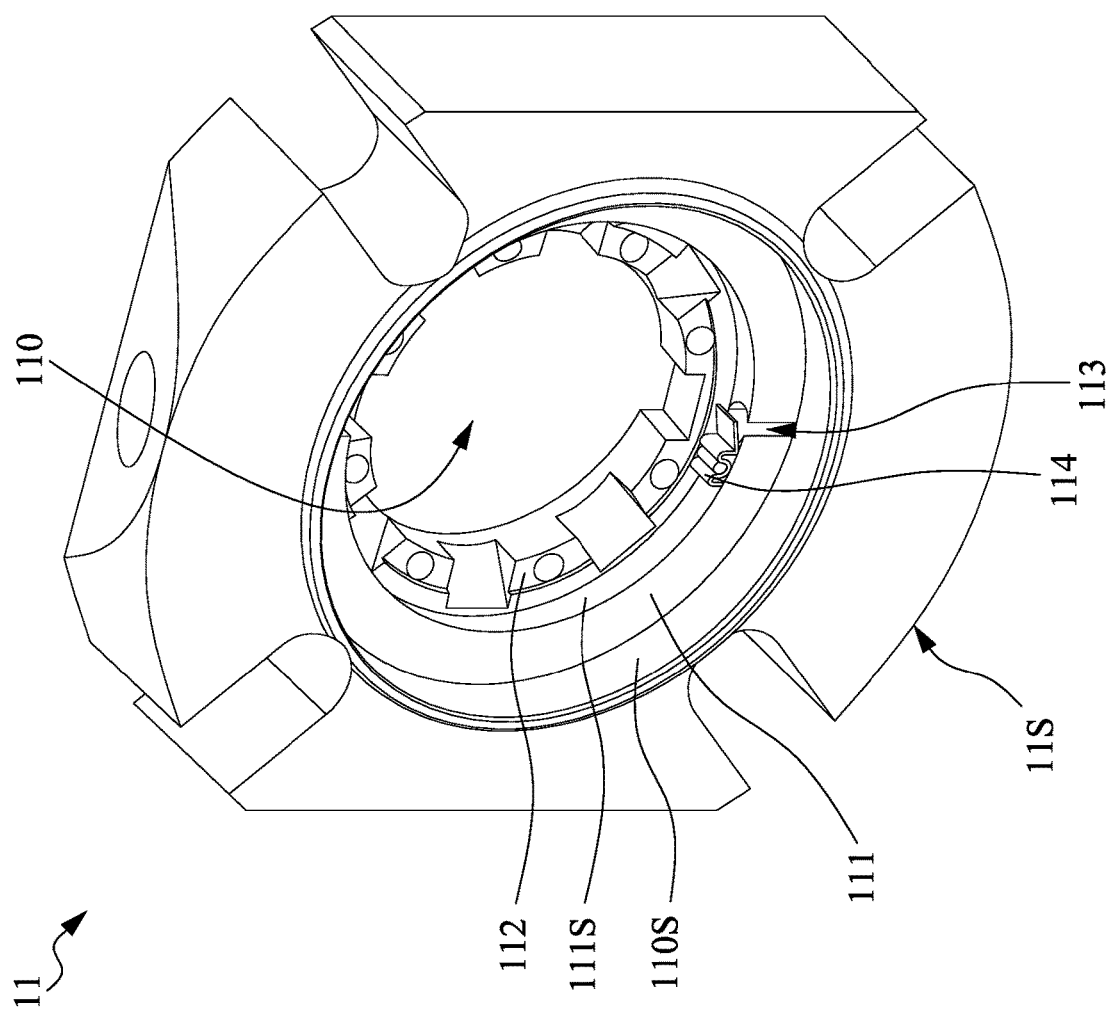
FIG. 1A illustrates a perspective diagram of a main body of a shaft seal device according to some embodiments of the present disclosure.

The description of the present disclosure below is accompanied by the drawings forming a part of this specification to illustrate the embodiments of the present disclosure. However, it should be noted that the present disclosure is not limited to these embodiments. Moreover, the embodiments below can be appropriately integrated into another embodiment.

The terms "an embodiment," "the embodiment," "exemplary embodiment," "other embodiment" and "another embodiment" means that the embodiments described in the present disclosure can include specific features, structures or characteristics; however, it should be noted that not every embodiment needs to include such specific features, structures or characteristics. In addition, repeated use of the expression "in/of the embodiment" does not necessarily refer to the same embodiment, but it may.

To fully understand the present disclosure, steps and structures are described in detail below. It is obvious that the implementation of the present disclosure does not limit specific details generally known to a person skilled in the art. Furthermore, generally known structures and steps are not described in detail to prevent unnecessary limitations to the present disclosure. The preferred embodiments of the present disclosure are described in detail as below. However, in addition to the detailed description, the present disclosure can also be extensively applied in other embodiments. The scope of the present disclosure is not limited to the contents given in the detailed description, but is defined by the appended claims.

It should be understood that the disclosure below provides various different embodiments or implementation examples for implementing different features of the present disclosure. Specific embodiments or implementation examples of components and arrangements are set forth below to simplify the present disclosure. It should be noted that such details are exemplary and are not intended to be restrictive. For example, a size of an element is not limited to a disclosed range or value, but can depend on an expected property of a manufacturing condition and/or device. Moreover, in the description below, a first feature formed "on" or "above" a second feature may also include an embodiment in which the first feature and the second feature are formed in a direct contact manner, and may include an embodiment in which an additional feature is formed between the first feature and the second feature in a way that the first feature and the second feature may not be in direct contact. For simplicity and clarity, various features may be depicted according to different scales. In the accompanying drawings, some layers/features are omitted for the sake of simplicity.

Moreover, for better illustration, terms of relative spatial relations such as "beneath," "below," "lower," "above" and "upper" may be used to describe a relation of one element or feature relative to another (other) element(s) or feature(s). Such terms of relative spatial relations are intended to cover different orientations of the element in use or in operation in addition to the orientations depicted in the drawings. An apparatus may be orientated otherwise (rotated 90 degrees or at other orientations) and the descriptive terms of the relative spatial relations used herein may also be similarly and correspondingly interpreted.

Figure 1B:
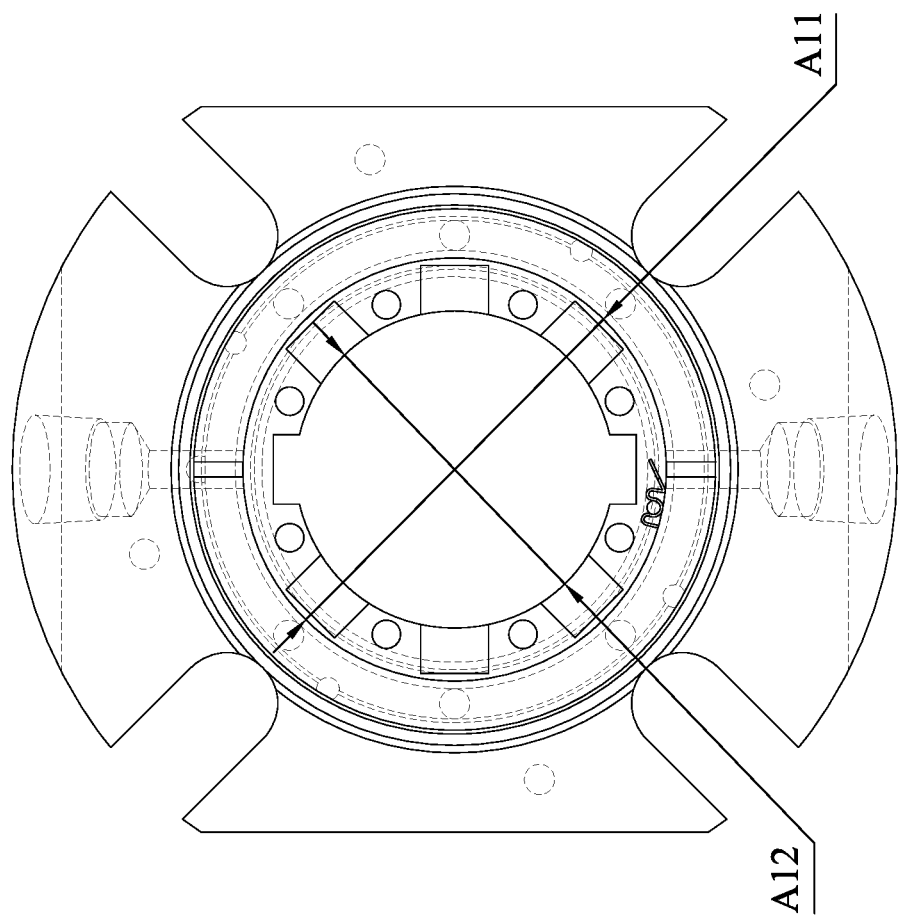
FIG. 1B illustrates a front view of a main body of a shaft seal device according to some embodiments of the present disclosure.

Please refer to FIG. 1A and FIG. 1B. FIG. 1A shows a perspective diagram of a main body 11 of a shaft seal device according to some embodiments of the present disclosure. FIG. 1B shows a front view of the main body 11 of the shaft seal device according to some embodiments of the present disclosure. Specifically, the main body 11 includes a channel 110, a first ring part 111, a second ring part 112, a liquid flow hole 113 and a diversion structure 114. In some embodiments, the diversion structure 114 includes a block piece.

As shown in the drawings, the channel 110 passes through the main body 11, and includes a channel inner peripheral surface 110S. The first ring part 111 is formed conformally on the channel inner peripheral surface 110S. The second ring part 112 is formed conformally on the channel inner peripheral surface 110S. A maximum aperture A11 of the first ring part 111 is greater than a maximum aperture A12 of the second ring part 112. In some embodiments, a hollow portion of the first ring part 111 is circular in shape, and the maximum aperture A11 is a diameter of the hollow portion. A hollow portion of the second ring part 112 is circular in shape, and the maximum aperture A12 is a diameter of the hollow portion.

In some embodiments, the liquid flow hole 113 passes through the main body 11 from an outer surface 11S of the main body 11 to a first inner peripheral surface 111S of the first ring part 111, thus allowing a liquid (for example, a shaft seal liquid) to flow between an outside of the main body 11 and the channel 110 of the main body 11. The diversion structure 114 (that is, the block piece) is disposed on the first inner peripheral surface 111S and is adjacent to the liquid flow hole 113.

In some embodiments, when the liquid flow hole 113 is used as a liquid outlet, the diversion structure 114 (that is, the block piece) is used for guiding the liquid to flow from the channel 110 to the liquid flow hole 113, thus allowing the liquid to be quickly discharged from the liquid flow hole 113. In some embodiments, when the liquid flow hole 113 is used as a liquid inlet, the diversion structure 114 (that is, the block piece) guides the liquid to flow from the liquid flow hole 113 to the channel 110, thus allowing the liquid from the liquid flow hole 113 to be quickly received in the channel 110.

Figure 2A:
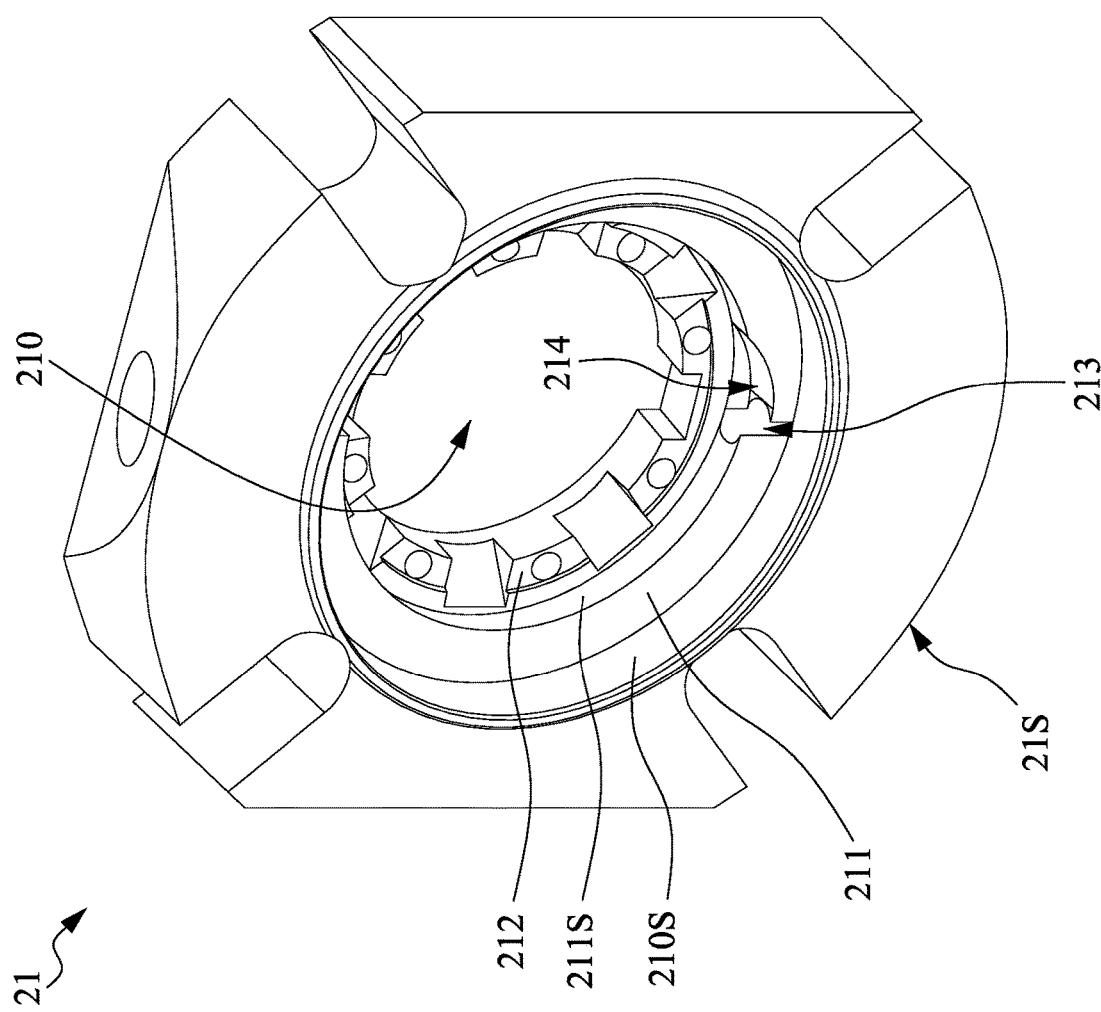
FIG. 2A illustrates a perspective diagram of a main body of a shaft seal device according to some embodiments of the present disclosure.
Figure 2B:
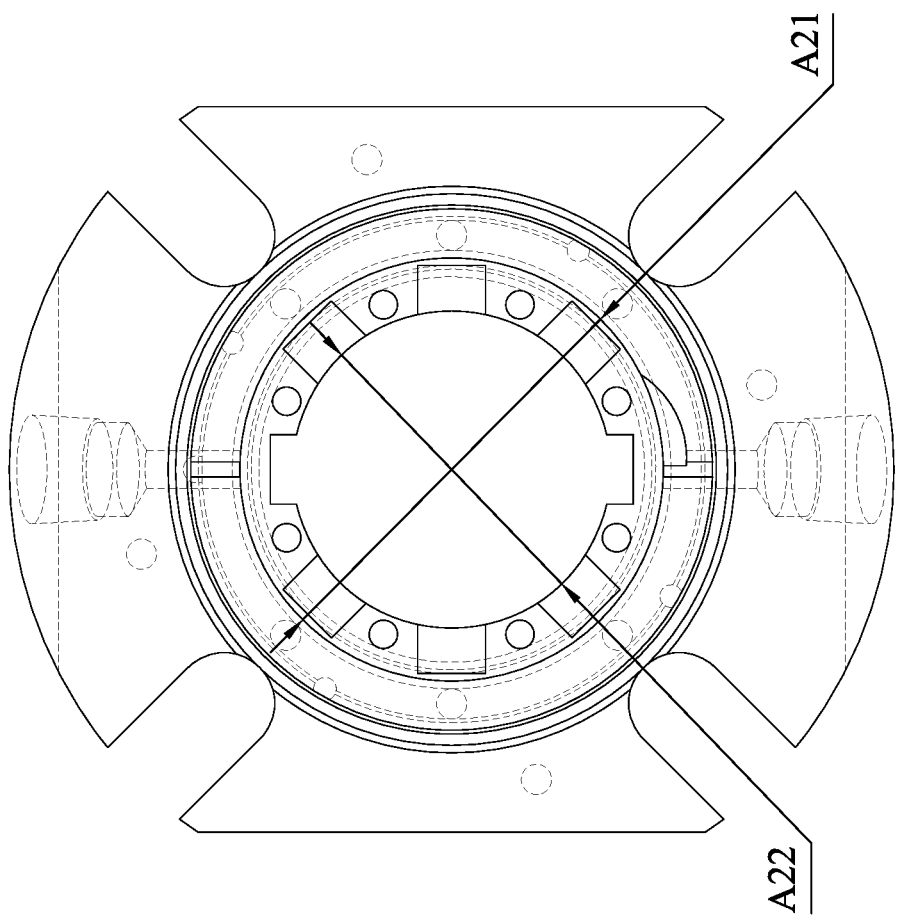
FIG. 2B illustrates a front view of a main body of a shaft seal device according to some embodiments of the present disclosure.

Please refer to FIG. 2A and FIG. 2B. FIG. 2A shows a perspective diagram of a main body 21 of a shaft seal device according to some embodiments of the present disclosure. FIG. 2B shows a front view of the main body 21 of the shaft seal device according to some embodiments of the present disclosure. Specifically, the main body 21 includes a channel 210, a first ring part 211, a second ring part 212, a liquid flow hole 213 and a diversion structure 214. In some embodiments, the diversion structure 214 includes a recess.

As shown in the drawings, the channel 210 passes through the main body 21, and includes a channel inner peripheral surface 210S. The first ring part 211 is formed conformally on the channel inner peripheral surface 210S. The second ring part 212 is formed conformally on the channel inner peripheral surface 210S. A maximum aperture A21 of the first ring part 211 is greater than a maximum aperture A22 of the second ring part 212. In some embodiments, a hollow portion of the first ring part 211 is circular in shape, and the maximum aperture A21 is a diameter of the hollow portion of the first ring part 211. A hollow portion of the second ring part 212 is circular in shape, and the maximum aperture A22 is a diameter of the hollow portion of the second ring part 212.

In some embodiments, the liquid flow hole 213 passes through the main body 21 from an outer surface 21S of the main body 21 to a first inner peripheral surface 211S of the first ring part 211, thus allowing a liquid to flow between an outside of the main body 21 and the channel 210 of the main body 21. The diversion structure 214 (that is, the recess) is disposed on the first inner peripheral surface 211S and is adjacent to the liquid flow hole 213.

In some embodiments, when the liquid flow hole 213 is used as a liquid outlet, the diversion structure 214 (that is, the recess) is used for guiding a flow direction of the liquid to the liquid flow hole 213, thus allowing the liquid to be quickly discharged from the liquid flow hole 213. In some embodiments, when the liquid flow hole 213 is used as a liquid inlet, the diversion structure 214 (that is, the recess) is used for guiding the flow direction of the liquid to the channel 210, thus allowing the liquid from the liquid flow hole 213 to be quickly received in the channel 210.

Figure 3A:
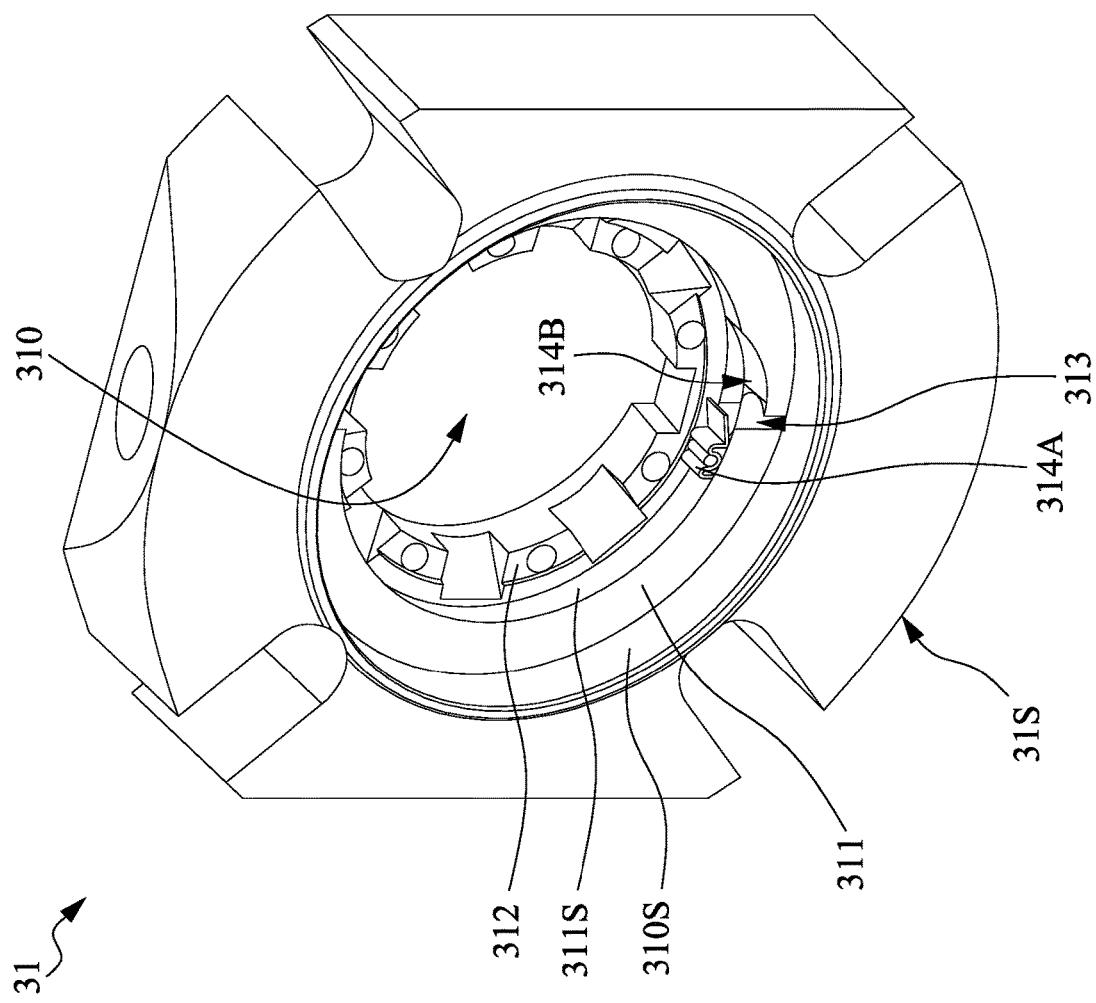
FIG. 3A illustrates a perspective diagram of a main body of a shaft seal device according to some embodiments of the present disclosure.
Figure 3B:
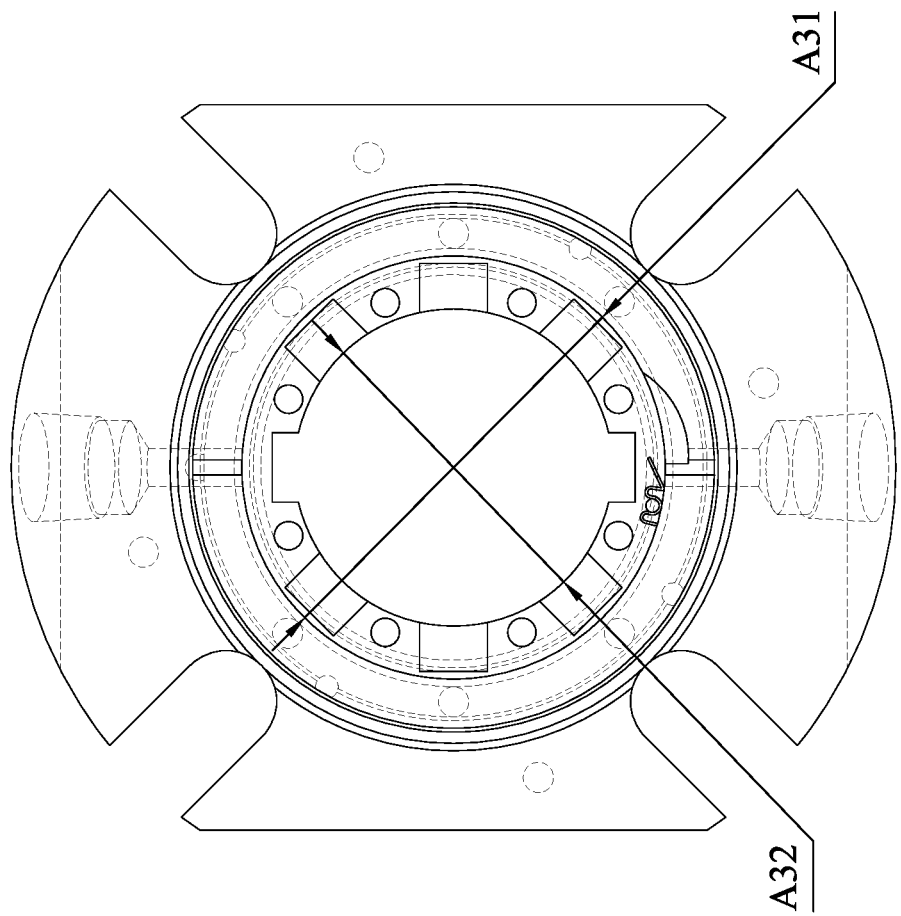
FIG. 3B illustrates a front view of a main body of a shaft seal device according to some embodiments of the present disclosure.

Please refer to FIG. 3A and FIG. 3B. FIG. 3A shows a perspective diagram of a main body 31 of a shaft seal device according to some embodiments of the present disclosure. FIG. 3B shows a front view of the main body 31 of the shaft seal device according to some embodiments of the present disclosure. Specifically, the main body 31 includes a channel 310, a first ring part 311, a second ring part 312, a liquid flow hole 313 and a diversion structure. In some embodiments, the diversion structure includes a block piece 314A and a recess 314B.

As shown in the drawings, the channel 310 passes through the main body 31, and includes a channel inner peripheral surface 310S. The first ring part 311 is formed conformally on the channel inner peripheral surface 310S. The second ring part 312 is formed conformally on the channel inner peripheral surface 310S. A maximum aperture A31 of the first ring part 311 is greater than a maximum aperture A32 of the second ring part 312. In some embodiments, a hollow portion of the first ring part 311 is circular in shape, and the maximum aperture A31 is a diameter of the hollow portion of the first ring part 311. A hollow portion of the second ring part 312 is circular in shape, and the maximum aperture A32 is a diameter of the hollow portion of the second ring part 312.

In some embodiments, the liquid flow hole 313 passes through the main body 31 from an outer surface 31S of the main body 31 to a first inner peripheral surface 311S of the first ring part 311, thus allowing a liquid to flow between an outside of the main body 31 and the channel 310 of the main body 31. The diversion structure is disposed on the first inner peripheral surface 311S. More specifically, the block piece 314A is disposed on the first inner peripheral surface 311S and is located on one side of the liquid flow hole 313, and the recess 314B is disposed on the first inner peripheral surface 311S and is formed on the other side of the liquid flow hole 313.

In some embodiments, when the liquid flow hole 313 is used as a liquid outlet, one surface of the block piece 314A facing the liquid flow hole 313 receives a liquid and returns the liquid back to the liquid flow hole 313. The recess 314B includes an arched surface, which is connected to the first inner peripheral surface 311S and the liquid flow hole 313, and forms a recess that gradually increases in size from the first inner peripheral surface 311S toward the liquid flow hole 313, so as to guide the liquid to the liquid flow hole 313, thus allowing the liquid to be quickly discharged from the liquid flow hole 313. In some embodiments, when the liquid flow hole 313 is used as a liquid inlet, one surface of the block piece 314A facing the liquid flow hole 313 receives a liquid and returns the liquid back to the channel 310, and the arched surface of the recess 314B guides the incoming liquid to the channel 310, thus allowing the liquid from the liquid flow hole 313 to be quickly received in the channel 310.

Figure 3C:
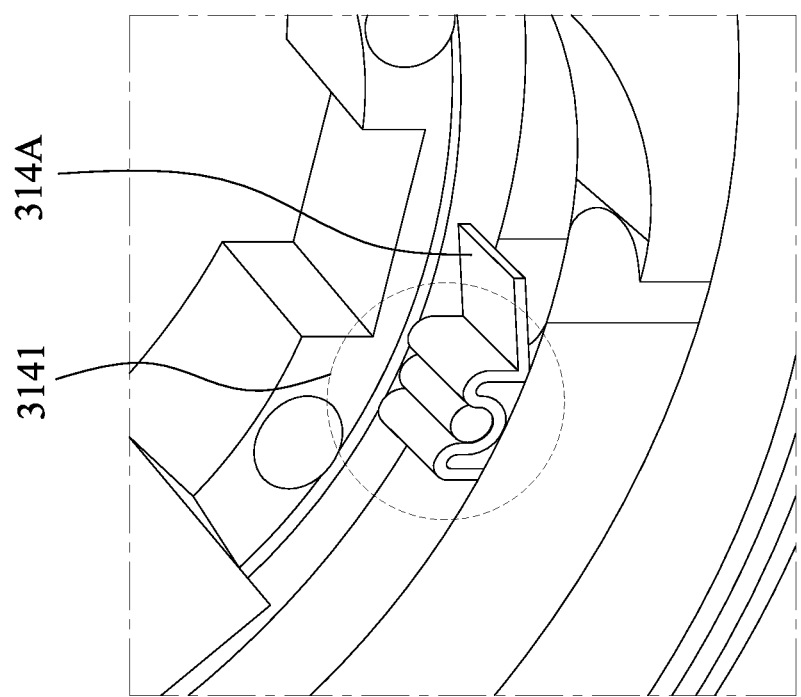
FIG. 3C illustrates an enlarged diagram of a block piece according to some embodiments of the present disclosure.
Figure 3D:
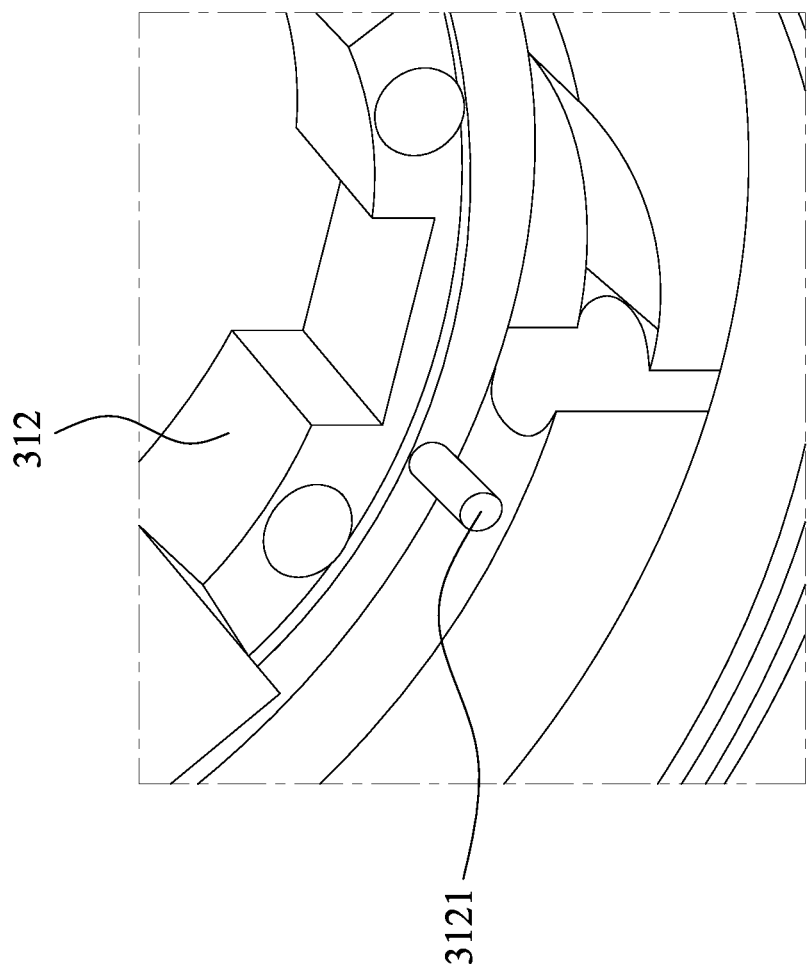
FIG. 3D illustrates a partial enlarged diagram of a main body according to some embodiments of the present disclosure.

Please refer to FIGS. 3C and 3D. FIG. 3C shows an enlarged diagram of the block piece 314A according to some embodiments of the present disclosure. FIG. 3D shows a partial enlarged diagram of the main body 31 according to some embodiments of the present disclosure. Specifically, the block piece 314A includes a positioning portion 3141, and the main body 31 includes a positioning member 3121. The positioning member 3121 is for positioning the positioning portion 3141, so as to position the block piece 314A at the main body 31. More specifically, the positioning member 3121 protrudes from one side surface of the second ring part 312 and is column-like in shape, and the positioning portion 3141 is corrugated in shape. When the positioning member 3121 positions the positioning portion 3141, a concave portion of the corrugated positioning portion 3141 accommodates the column-like positioning member 3121, and a part of the concave portion of the positioning portion 3141 is secured between the positioning member 3121 and the first inner peripheral surface 311S.

Figure 3E:
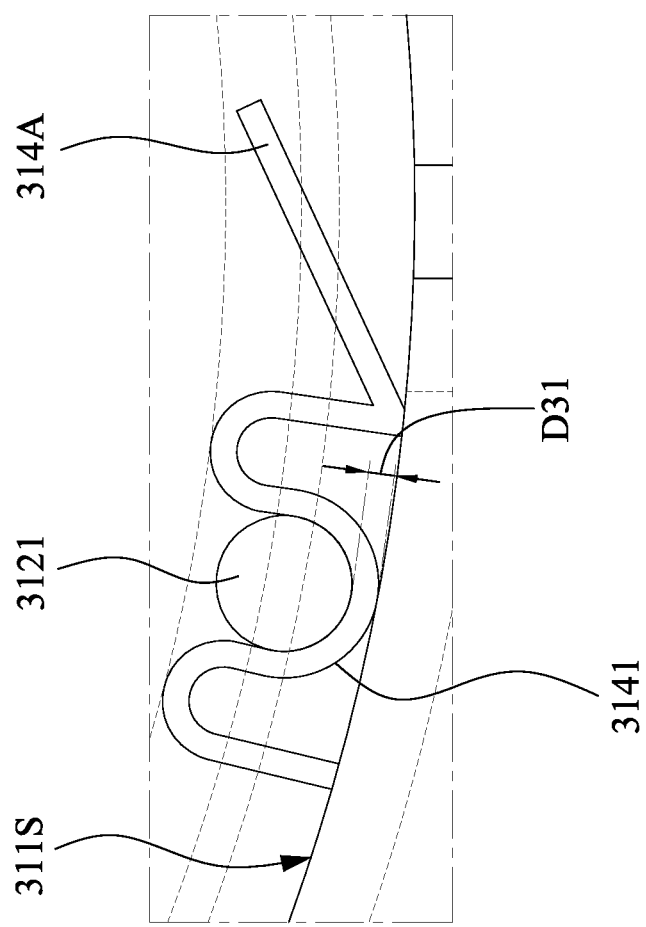
FIG. 3E illustrates an enlarged diagram of a block piece positioned at a main body according to some embodiments of the present disclosure.

Please refer to FIG. 3E. FIG. 3E shows an enlarged diagram of the block piece 314A positioned at the main body 31 according to some embodiments of the present disclosure. Specifically, in some embodiments, the positioning member 3121 and the first inner peripheral surface 311S of the first ring part 311 have a distance D31 therebetween. The positioning portion 3141 may have a thickness equal to or slightly greater than the distance D31, and may be made of a durable material. Accordingly, as shown in the drawings, when the concave portion of the corrugated positioning portion 3141 accommodates the column-like positioning member 3121, the positioning portion 3141 is stably secured between the positioning member 3121 and the first inner peripheral surface 311S.

Figure 3F:
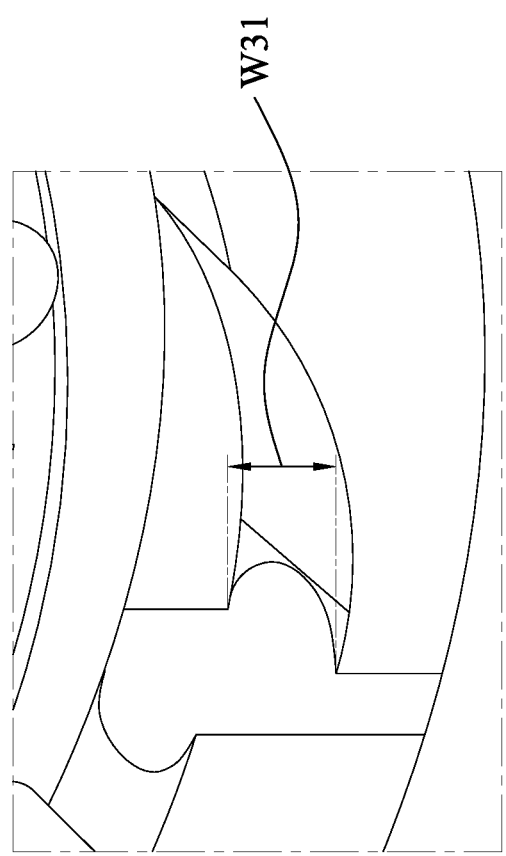
FIG. 3F illustrates an enlarged diagram of a recess according to some embodiments of the present disclosure.
Figure 3G:
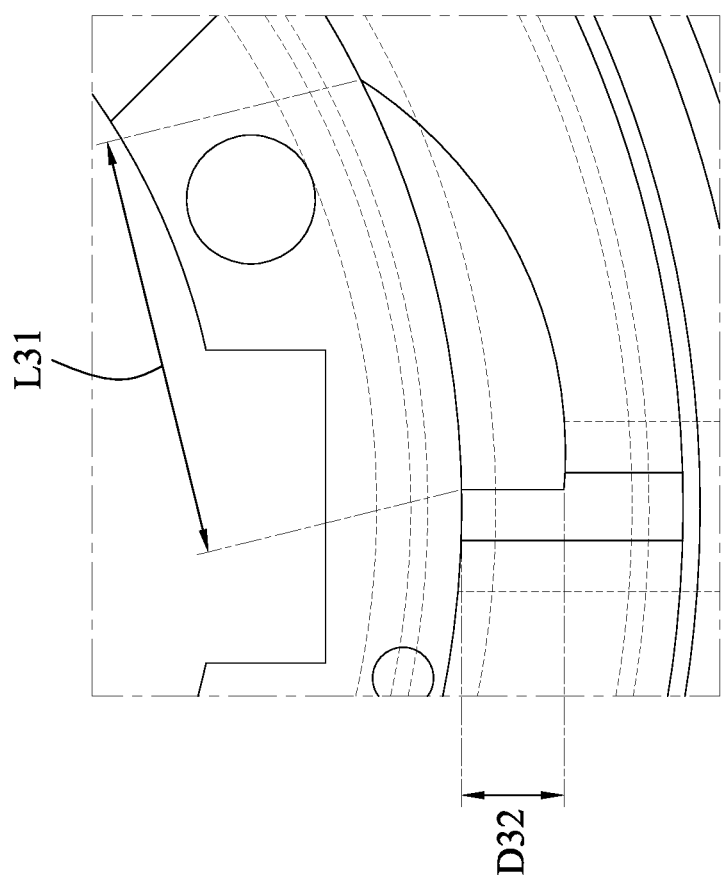
FIG. 3G illustrates a schematic diagram of a recess according to some embodiments of the present disclosure.

Please refer to FIGS. 3F and 3G. FIG. 3F shows an enlarged diagram of the recess 314B according to some embodiments of the present disclosure. FIG. 3G shows a schematic diagram of the recess 314B according to some embodiments of the present disclosure. Specifically, the recess 314B has a maximum width W31, a maximum length L31 and a maximum depth D32. In some embodiments, a ratio of the maximum width W31 to the maximum depth D32 is between 1.5 and 2.5. In some embodiments, a ratio of the maximum length L31 to the maximum width W31 is between 1.5 and 2.5.

Figure 4A:
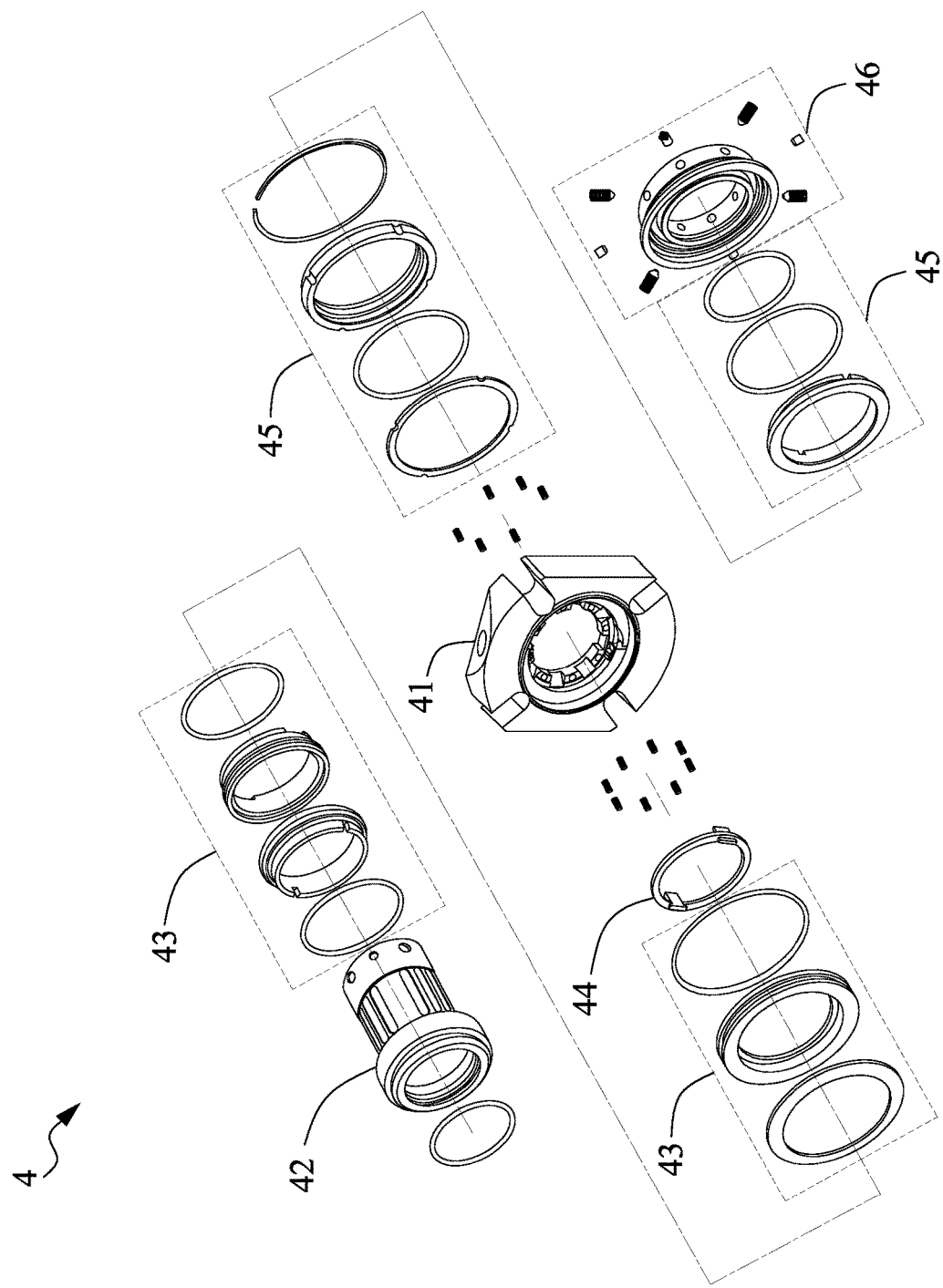
FIG. 4A illustrates an exploded diagram of a shaft seal device according to some embodiments of the present disclosure.
Figure 4B:
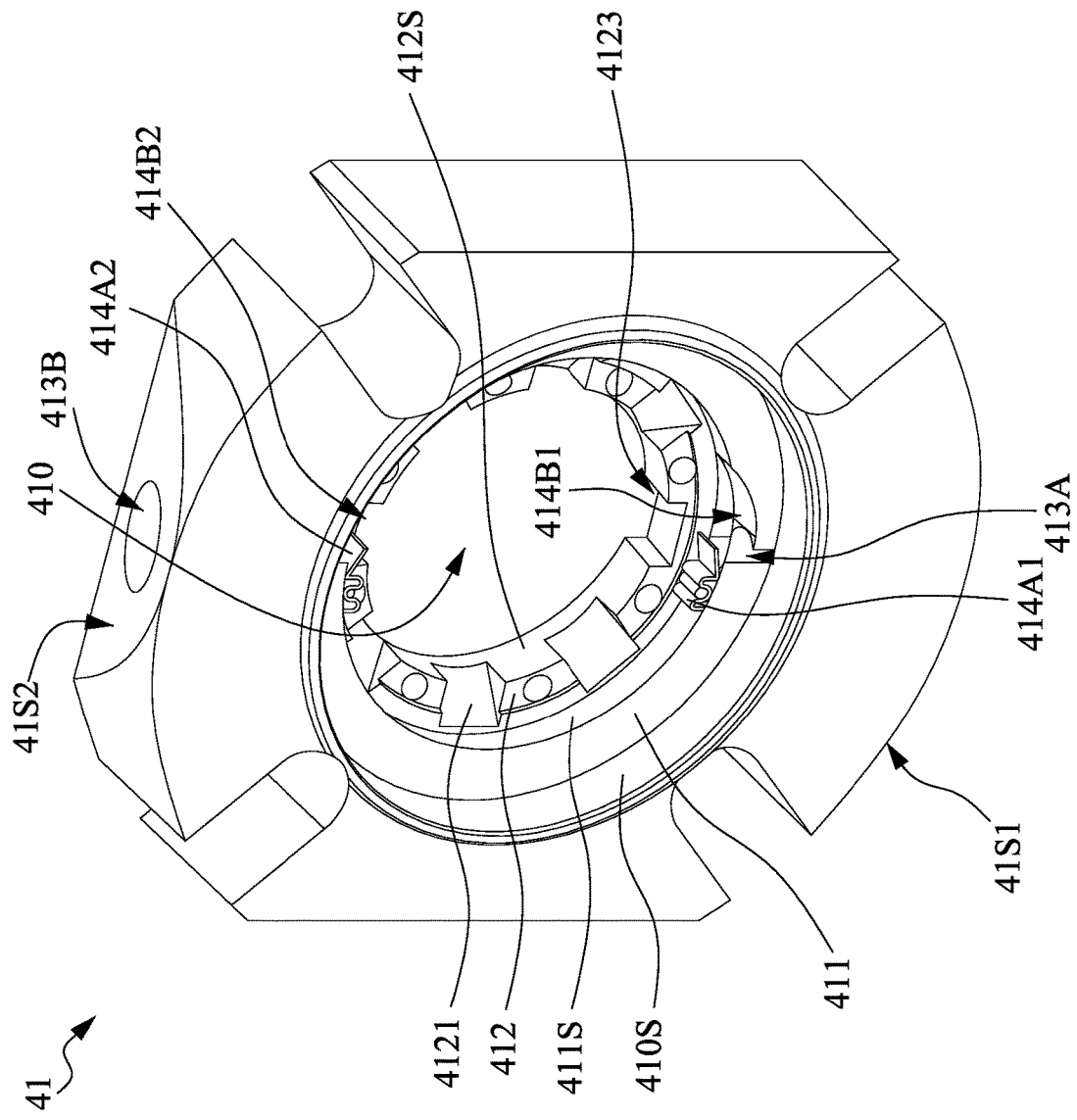
FIG. 4B illustrates a perspective diagram of a main body according to some embodiments of the present disclosure.
Figure 4C:
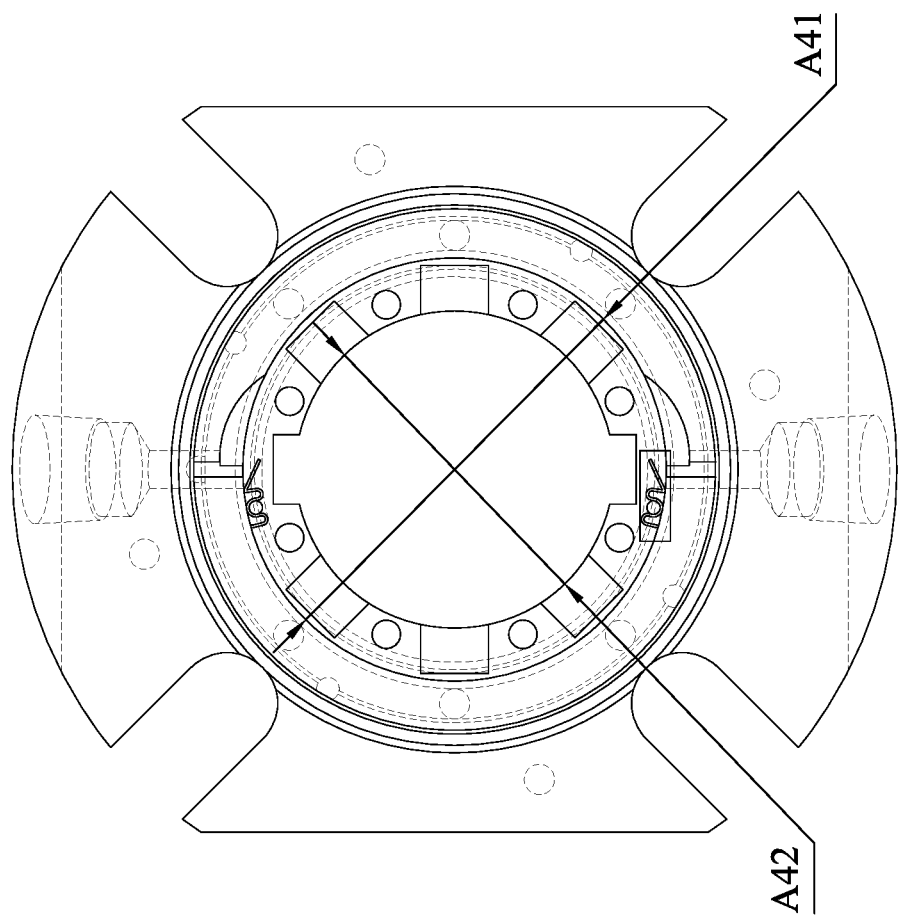
FIG. 4C illustrates a front view of a main body according to some embodiments of the present disclosure.

Please refer to FIG. 4A. FIG. 4A shows an exploded diagram of a shaft seal device 4 according to some embodiments of the present disclosure. Specifically, the shaft seal device 4 includes a main body 41, a shaft sleeve 42, a first seal component 43, a compression ring 44, a second seal component 45 and a shaft collar 46. Please also refer to FIGS. 4B and 4C. FIG. 4B shows a perspective diagram of the main body 41 according to some embodiments of the present disclosure. FIG. 4C shows a front view of the main body 41 according to some embodiments of the present disclosure. Specifically, the main body 41 includes a channel 410, a first ring part 411, a second ring part 412, two liquid flow holes 413A and 413B, and a diversion structure. In some embodiments, the diversion structure includes two block pieces 414A1 and 414A2, and two recesses 414B1 and 414B2.

As shown in the drawings, the channel 410 passes through the main body 41, and includes a channel inner peripheral surface 410S. The first ring part 411 is formed conformally on the channel inner peripheral surface 410S. The second ring part 412 is formed conformally on the channel inner peripheral surface 410S. A maximum aperture A41 of the first ring part 411 is greater than a maximum aperture A42 of the second ring part 412. In some embodiments, a hollow portion of the first ring part 411 is circular in shape, and the maximum aperture A41 is the diameter of the hollow portion of the first ring part 411. A hollow portion of the second ring part 412 is circular in shape, and the maximum aperture A42 is the diameter of the hollow portion of the second ring part 412.

In some embodiments, the liquid flow hole 413B passes through the main body 41 from an outer surface 41S2 on an upper side of the main body 41 to a first inner peripheral surface 411S of the first ring part 411, thus allowing a liquid to enter the channel 410 from the liquid flow hole 413B. The liquid flow hole 413A passes through the main body 41 from an outer surface 41S1 on a lower side of the main body 41 to the first inner peripheral surface 411S of the first ring part 411, thus allowing a liquid to be discharged from the liquid flow hole 413A.

In some embodiments, the diversion structure is disposed on the first inner peripheral surface 411S. More specifically, the block piece 414A2 is disposed on the first inner peripheral surface 411S and is located on one side of the liquid flow hole 413B, and the recess 414B2 is disposed on the first inner peripheral surface 411S and is formed on the other side of the liquid flow hole 413B. One surface of the block piece 414A2 facing the liquid flow hole 413B receives a liquid, and returns the liquid back to the channel 410. The recess 414B2 includes an arched surface, which is connected to the first inner peripheral surface 411S and the liquid flow hole 413B and forms a recess that gradually increases in size from the first inner peripheral surface 411S toward the liquid flow hole 413B, so as to guide the incoming liquid to the channel 410. Accordingly, the liquid from the liquid flow hole 413B can be quickly received in the channel 410.

Moreover, the block piece 414A1 is disposed on the first inner peripheral surface 411S and is located on one side of the liquid flow hole 413A, and the recess 414B1 is disposed on the first inner peripheral surface 411S and is formed on the other side of the liquid flow hole 413A. One surface of the block piece 414A1 facing the liquid flow hole 413A receives a liquid, and returns the liquid back to the liquid flow hole 413A. The recess 414B1 includes an arched surface, which is connected to the first inner peripheral surface 411S and the liquid flow hole 413A and forms a recess that gradually increases in size from the first inner peripheral surface 411S toward the liquid flow hole 413A, so as to guide the liquid to the liquid flow hole 413A. Accordingly, the liquid can be quickly discharged from the liquid flow hole 413A.

In some embodiments, a plurality of sloped notches 4121 are formed on the second ring part 412, wherein each of the sloped notches 4121 includes a sloped surface, the sloped surface extends from a second inner peripheral surface 412S of the second ring part 412 to the first inner peripheral surface 411S, and the sloped surface is for guiding a flow direction of a liquid so as to increase a flow speed of the liquid. In some embodiments, a slope of the sloped surface ranges between 0.8 and 1.2.

Figure 4D:
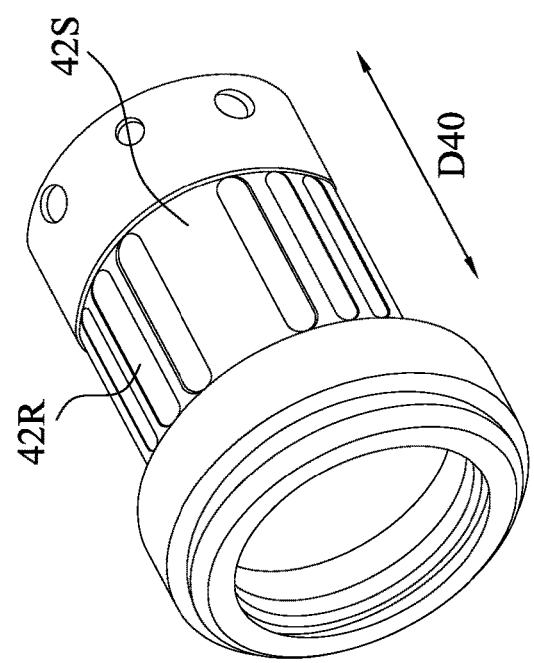
FIG. 4D illustrates a perspective diagram of a shaft sleeve according to some embodiments of the present disclosure.
Figure 4D:
Figure 4E:
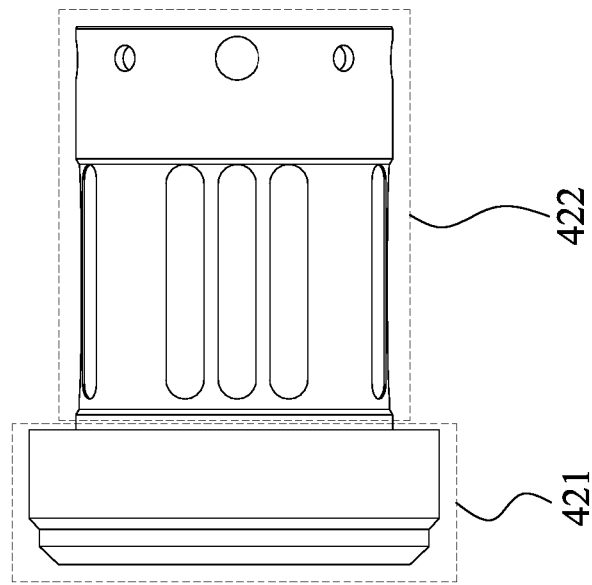
FIG. 4E illustrates a side view of a shaft sleeve according to some embodiments of the present disclosure.

Please refer to FIG. 4D and FIG. 4E. FIG. 4D shows a perspective diagram of the shaft sleeve 42 of the present disclosure. FIG. 4E shows a side view of the shaft sleeve 42 of the present disclosure. Specifically, the shaft sleeve 42 includes a plurality of grooves 42R, which are formed on a shaft sleeve outer peripheral surface 42S of the shaft sleeve 42 and are for guiding a flow direction of a liquid so as to increase a flow speed of the liquid. Each of the grooves 42R extends in a lengthwise direction D40 of the shaft sleeve 42.

In some embodiments, a liquid may include a corrosive acidic liquid, and the shaft sleeve 42 may be made of a corrosion-resistant material in order to prevent corrosion by such acidic liquid. However, due to high costs and difficulties in processing of metal corrosion-resistant materials, the material of the shaft sleeve 42 includes silicon carbide or tungsten carbide.

More specifically, the shaft sleeve 42 includes a first end portion 421 and a second end portion 422. A maximum width of the first end portion 421 is greater than a maximum width of the channel 410 of the main body 41, and a maximum width of the second end portion 422 is less than the maximum width of the channel 410 of the main body 41. Accordingly, when the shaft sleeve 42 is inserted in the channel 410 of the main body 41, the shaft sleeve outer peripheral surface 42S of the shaft sleeve 42 corresponds in position to the channel inner peripheral surface 410S, the first end portion 421 is located outside the channel 410, and a part of the second end portion 422 is also located outside the channel 410.

In some embodiments, when the shaft sleeve 42 is inserted in the channel 410 of the main body 41, the shaft collar 46 is sleeved at the part of the second end portion 422 of the shaft sleeve 42 located outside the channel 410. A maximum width of the shaft collar 46 is greater than the maximum width of the channel 410 of the main body 41.

Accordingly, the main body 41 is securely sandwiched between the first end portion 421 of the shaft sleeve 42 and the shaft collar 46.

In some embodiments, the first seal component 43 and the second seal component 45 are sleeved outside the shaft sleeve 42 so as to achieve the effect of sealing the shaft seal device 4. The compression ring 44 is securely sandwiched between the second ring part 412 of the main body 41 and the first end portion 421 of the shaft sleeve 42. The second ring part 412 of the main body 41 includes a plurality of positioning slots 4123, which are formed on the second inner peripheral surface 412S and are for receiving protrusions of the compression ring 44 so as to position the compression ring 44.

The present disclosure and the advantages thereof are described in detail as above. However, it should be understood that various modifications, replacements and substitutions can be made without departing from the spirit and scope of the present disclosure as defined by the appended claims. For example, various processes above may be implemented by different approaches, and other processes or a combination thereof may be used in substitution for the various processes above.

Moreover, the scope of the present application is not limited to specific embodiments of the processes, machines, manufacturing, substance compositions, means, methods or steps given in this specification. A person skilled in the art could understand from the disclosure of the present application that existing or future developed processes, machines, manufacturing, substance compositions, means, methods or steps which achieve the same functions or achieve substantially the same results corresponding to those of the embodiments described herein can be utilized according to the present disclosure. Accordingly, such processes, machines, manufacturing, substance compositions, means, methods and steps are encompassed within the scope of the claims of the present application.

What is claimed is:

1. A shaft seal component, comprising:
   a main body, comprising:
   a channel, passing through the main body, having a channel inner peripheral surface;
   a first ring part, formed on the channel inner peripheral surface;
   a second ring part, formed on the channel inner peripheral surface, wherein an aperture of the first ring part is greater than an aperture of the second ring part;
   a liquid flow hole, passing through the main body from an outer surface of the main body to a first inner peripheral surface of the first ring part; and
   a diversion structure, disposed on the first inner peripheral surface, and adjacent to the liquid flow hole,
   wherein the diversion structure comprises a block piece for guiding a liquid to flow between the liquid flow hole and the channel, and a recess facing to the block piece, the liquid flow hole is between the block piece and the recess,
   wherein the block piece comprises a positioning portion for positioning the block piece at the main body,
   wherein the main body further comprises:
   a positioning member, protruding from a side surface of the second ring part, for positioning the positioning portion of the block piece,
   wherein the positioning portion is a corrugated positioning portion, and a concave portion of the corrugated positioning portion is configured to accommodate the positioning member.

2. The shaft seal component according to claim 1, wherein a surface of the block piece at least partially overlaps the liquid flow hole.

3. The shaft seal component according to claim 1, wherein the recess includes an arched surface, which is connected to the first inner peripheral surface and the liquid flow hole.

4. The shaft seal component according to claim 3, wherein a ratio of a maximum width of the recess along an axial direction of the channel to a maximum depth of the recess along a radial direction of the channel is between 1.5 and 2.5, and a ratio of a maximum length of the recess along a circumferential direction of the channel to the maximum width of the recess is between 1.5 and 2.5.

5. The shaft seal component according to claim 1, wherein the second ring part comprises:
   a sloped notch, having a sloped surface, the sloped surface extends from a second inner peripheral surface of the second ring part toward the first inner peripheral surface.

6. The shaft seal component according to claim 5, wherein a slope of the sloped surface ranges between 0.8 and 1.2.

7. The shaft seal component according to claim 1, wherein the second ring part includes at least one positioning slot, which is formed on the second inner peripheral surface and is for positioning a compression ring.

8. A shaft seal device, comprising:
   a shaft seal component of claim 1; and
   a shaft sleeve, partially inserted in the channel of the main body, the shaft sleeve having a shaft sleeve outer peripheral surface corresponding in position to the channel inner peripheral surface.

9. The shaft seal device according to claim 8, wherein the shaft sleeve includes at least one groove formed on the shaft sleeve outer peripheral surface.

10. The shaft seal device according to claim 9, wherein the at least one groove extends in a lengthwise direction of the shaft sleeve.

11. The shaft seal device according to claim 8, wherein the shaft sleeve includes a first end portion and a second end portion, a maximum width of the first end portion is greater than a maximum width of the channel, and a maximum width of the second end portion is less than the maximum width of the channel; wherein when the shaft sleeve is inserted in the channel, the first end portion and a part of the second end portion are located outside the channel.

12. The shaft seal device according to claim 11, further comprising:
   a shaft collar, for being sleeved at the part of the second end portion of the shaft sleeve when the shaft sleeve is partially inserted in the channel, wherein a maximum width of the shaft collar is greater than the maximum width of the channel.

13. The shaft seal device according to claim 8, wherein a material of the shaft sleeve comprises silicon carbide or tungsten carbide.

* * * * *